United States Patent
Vasudevan et al.

(10) Patent No.: US 7,793,306 B2
(45) Date of Patent: Sep. 7, 2010

(54) PROVIDING NEW FUNCTIONALITY WHILE MAINTAINING BACKWARD COMPATIBILITY

(75) Inventors: Lavanya Vasudevan, Sammamish, WA (US); Marilyn Chen, Atherton, CA (US); Michael D. Stokes, Eagle, ID (US); Michael Bourgoin, Lake Forest Park, WA (US); Jeff Bloomfield, Redmond, WA (US); Anthony Presley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 11/244,185

(22) Filed: Oct. 6, 2005

(65) Prior Publication Data

US 2007/0083874 A1    Apr. 12, 2007

(51) Int. Cl.
*G06F 3/12* (2006.01)

(52) U.S. Cl. ...................................... 719/320

(58) Field of Classification Search ................... 719/320
See application file for complete search history.

(56) References Cited

U.S. PATENT DOCUMENTS

| 6,075,888 | A  | * | 6/2000  | Schwartz .................... 382/167 |
| 6,603,879 | B2 | * | 8/2003  | Haikin et al. ............... 382/167 |
| 7,080,058 | B1 | * | 7/2006  | Upadhyayula et al. ......... 707/1 |
| 2005/0237547 | A1 | * | 10/2005 | Ito et al. ..................... 358/1.9 |

* cited by examiner

Primary Examiner—Hyung S Sough
Assistant Examiner—Syed Roni
(74) Attorney, Agent, or Firm—Shook, Hardy & Bacon L.L.P.

(57) ABSTRACT

The invention discloses a system method for providing new functionality to an operating system while maintaining backward compatibility with existing applications. The invention can provide new functionality while maintaining backward compatibility without a requirement to change any syntax of an API and without having to create new APIs for all functions. The invention can be configured to pass monolithic data as well as modular data through either legacy APIs or newly created APIs.

17 Claims, 7 Drawing Sheets

PROVIDING NEW FUNCTIONALITY WHILE MAINTAINING BACKWARD COMPATIBILITY

CROSS-REFERENCE TO RELATED APPLICATION

Not applicable.

STATEMENT REGARDING FEDERALLY SPONSORED RESEARCH OR DEVELOPMENT

Not applicable.

BACKGROUND

New data profiles and application program interfaces (APIs) can add new functionality and features that may not be present in an existing operating system. However, a problem can arise in which new data profiles and APIs may not be compatible with existing legacy profiles and APIs. One solution to this problem could be to just create new APIs to replace the current legacy APIs being used by an operating system, or to just change the syntax of the legacy APIs to be able to obtain new functionality. However, this may not be desirable because an operating system could lose all support for the legacy applications that may still be useful and desirable to maintain for users. It may therefore be desirable for there to be a method that can allow an operating system to receive new functionality while maintaining interoperability with current legacy APIs without having to change any syntax of the legacy APIs.

SUMMARY

The invention discloses a method for providing new functionality to an operating system while maintaining backward compatibility with legacy applications. The invention can store a data profile at a memory location, wherein the data profile can reference other data profiles. The invention can further provide an API with a syntax. The syntax can comprise a pointer that points to an object, wherein the object can include a second pointer that points to the memory location. Additionally, the invention can call the API, and the API can provide a handle to an internal object profile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
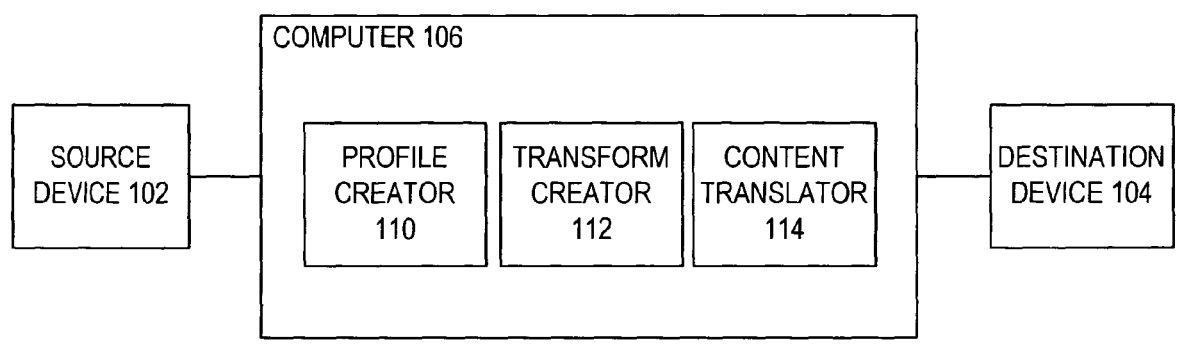
FIG. 1 illustrates an embodiment of a system for translating a source color to a destination color.

The invention discloses a system and method for providing new functionality to operating systems while maintaining backward compatibility with legacy applications, application program interfaces (APIs), and data without having to change any syntax of the legacy APIs. The invention can add new functionality while maintaining backward compatibility while using either legacy APIs and profiles or newly created APIs and profiles. The invention can be applied to any type of legacy API when adding new functionality to the legacy API. One such utilization of the invention can be applied to color management applications and APIs of an operating system.

With current technology, transferring content from one device to another can be a common occurrence. When transferring content from a source device to a destination device, it may be desirable for the content received at the destination device to accurately match the appearance of the content stored on the source device.

Maintaining consistency of the color of content can be one aspect of trying to accurately maintain the appearance of content transferred from a source device to a destination device. In 1993, a number of industry vendors established the International Color Consortium (ICC) for a purpose of creating, promoting and encouraging the standardization and evolution of an open, vendor-neutral, cross-platform color management system architecture and components. An outcome of this cooperation was the development of a ICC profile specification.

One intent of the ICC profile format was to provide a cross-platform device profile format that could be used to translate color data created on one device into another device's native color space. Many operating systems and developers have adopted these ICC profile formats since then. However, it could prove to be a difficult task to create a new color management system that can introduce new functionality while maintaining compatibility with existing legacy ICC profiles and APIs. It may also be difficult to maintain consistency between devices that utilize existing legacy applications and devices that employ new applications with new functionalities. For example, when translating content from a device that employs a new application with new APIs, some functionalities may get lost in translation to a device that does not possess the new application.

One such new color management system that can overcome deficiencies with current technology is a Windows Color System (WCS). The new WCS can allow legacy ICC profiles and APIs to be compatible with new WCS profiles and APIs without having to change the syntax of the legacy APIs. The syntax of an API can define how many parameters are needed to be passed through the API, a sequence in which the parameters are processed through the API, and what data type of parameters can be processed through the API. The WCS can be configured to provide transparent, modular, consistent, and reliable color matching across different software applications, imaging devices, imaging media, and viewing conditions. The WCS can be configured to introduce new Extensible Markup Language (XML) based profiles including a Device Model Profile (DMP), a Color Appearance Model Profile (CAMP), and a Gamut Map Model Profile (GMMP). The DMP can include objective intradevice data that can describe color characteristics of a device. The CAMP can include objective interdevice data that can describe viewing conditions. The GMMP can include subjective interdevice data that can gamut mapping.

Unlike legacy ICC profiles that are opaque and monolithic, the new WCS profiles can be configured to be transparent and modular. An opaque ICC color profile may be a preprocessed profile that can be designed or documented such that a third party may not be able to accurately predict what processing is taking place internally to the profile, making it difficult to understand what to correct or adjust in case something goes wrong. Adjusting a part of an ICC color profile can have unpredictable consequences since the algorithms may be effectively undocumented. However, a transparent WCS profile may be a profile that is not preprocessed and can include objective measurement data of a DMP, a GMMP, and a CAMP. A transparent WCS profile can also be documented such that each aspect of processing a profile is well documented so that a third party can accurately predict what processing is taking place internally to the profile, making it much easier to understand what to correct or adjust in case something goes wrong. A monolithic ICC color profile can be one big lookup table of information that can include all aspects of device conditions, viewing conditions, and gamut mapping. Since the ICC color profile can include one big lookup table of information, a monolithic ICC color profile may have to replace/modify unrelated aspects of the profile in order to adjust any specific aspect of the profile. For ICC color profiles, one may have to replace the gamut mapping and viewing conditions if one has an unrelated device measurement error. However, with a modular WCS profile one can adjust specific aspects of the profile without having to change unrelated aspects of the profile as an individual DMP, GMMP, and CAMP can be used to represent one entire ICC color profile. Therefore in WCS, one can adjust the device measurements in the DMP without changing or touching the GMMP or the CAMP. The WCS can reside within an operating system of a computer and can include a Color Infrastructure and Translation Engine (CITE) that can act as a core engine of the WCS. The WCS CITE can include methods, classes and components that can drive the translation of a source color from a source device to a destination color of a destination device.

FIG. 1 illustrates an embodiment of a system for translating source color to a destination color with a processing unit. The source device 102, destination device 104, and the computer 106 can include devices such as digital still camera devices, digital video cameras (with or without still image capture functionality), portable media players such as personal music players and personal video players, cell phones (with or without media capturing/playback capabilities), any other media devices, monitors, printers, scanners, or any other multimedia data storage/processing device. The source device, destination device, and the computer can also include a desktop or laptop computer, a network-enabled cellular telephone, wireless email client, or other client, machine or device to perform various tasks including Web browsing, search, electronic mail (email) and other tasks, applications and functions. The source device, destination device, and the computer may additionally include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

The source device 102, destination device 104, and the computer 106 can include a communication interface. The communication interface may be an interface that can allow the source device, destination device, and the computer to be directly connected to one another or any other device, or can allow the source device, destination device, and the computer to be connected to one another or any other device over a network. The network can include, for example, a local area network (LAN), a wide area network (WAN), or the Internet. In an embodiment, the source device, destination device, and the computer can be connected to one another or any another device via a wireless interface.

Computer 106 can include a profile creator 110, a transform creator 112, and a content translator 114 that can be used together to translate content from a source device 102 to a destination device 104. Profile creator 110 can be utilized to receive content profiles from the source device 102 and the destination device 104, and can create a handle to an internal profile object associated with the source device and a handle to an internal profile object associated with the destination device. The transform creator 112 can be used to receive the handles created by the profile creator 110, create an optimized transform, and create a handle to an internal transform profile as the first pointer just points to an object and the object points to a file name. Once the API is used to process the source profile, a handle to an internal profile object 208 can be produced.

The profile creator can also receive a destination profile from a destination device in step 206. The destination profile can include a data structure that describes characteristics of the destination device. In an embodiment involving color management, the destination profile can be a color profile that can describe color characteristics of the destination device. An application within the core engine of the computer can call an API to begin processing the destination profile. In an embodiment involving color management, such an API can be, for example, an OpenColorProfile API. The API can be given a data structure that includes a file name to the destination profile, or the API can be given a data structure that includes bits of the destination profile. The destination profile can be referenced by passing a first pointer that points to an object through the API. The object can be, for example, a second pointer that can point to the file name of the destination profile. Therefore, the application running the API can process the destination profile without requiring the application to have any knowledge of an internal structure of the destination profile as the first pointer just points to an object and the object points to a file name. Once the API is used to process the destination profile, a handle to an internal profile object 210 can be produced. Both handles 208 and 210 can then be transmitted to a transform creation stage of processing 212.

In stage two of processing, a second API can be called to further process the handles 208 and 210. In an embodiment involving color management, the second API can include, for example, a CreateMultiProfileTransform API. The second API can take the two handles 208 and 210 along with an optional rendering intent array 214 and can produce an optimized transform 218. The optional rendering intent array can include any type of subjective user preference data. The optimized transform 218 can include a lookup table that an interpolator can use to convert a source profile to a destination profile. A handle to an internal transform object 220 can be produced from the optimized transform 218 and can be transmitted to a content translation stage of processing 222.

In stage three of processing, a third API 226 can be called to further process the handle 220. In an embodiment involving color management, the third API can be, for example, a TranslateColors API. The third API can take the handle to the internal transform object 220 and the actual content 224 to be translated from the source device, and can output content 228 to the destination device that has been properly translated through the optimized transform 218 that was created. In an embodiment involving color management, the content 224 can include an array of colors. In another embodiment involving color management, the third API can include, for example, a TranslateBitmapBits API. A TranslateBitmapBits API can translate content from a source device to a destination device in the same manner as a TranslateColors API, however, instead of translating for an array the TranslateBitmapBits API can translate for a bitmap.

Figure 3A:
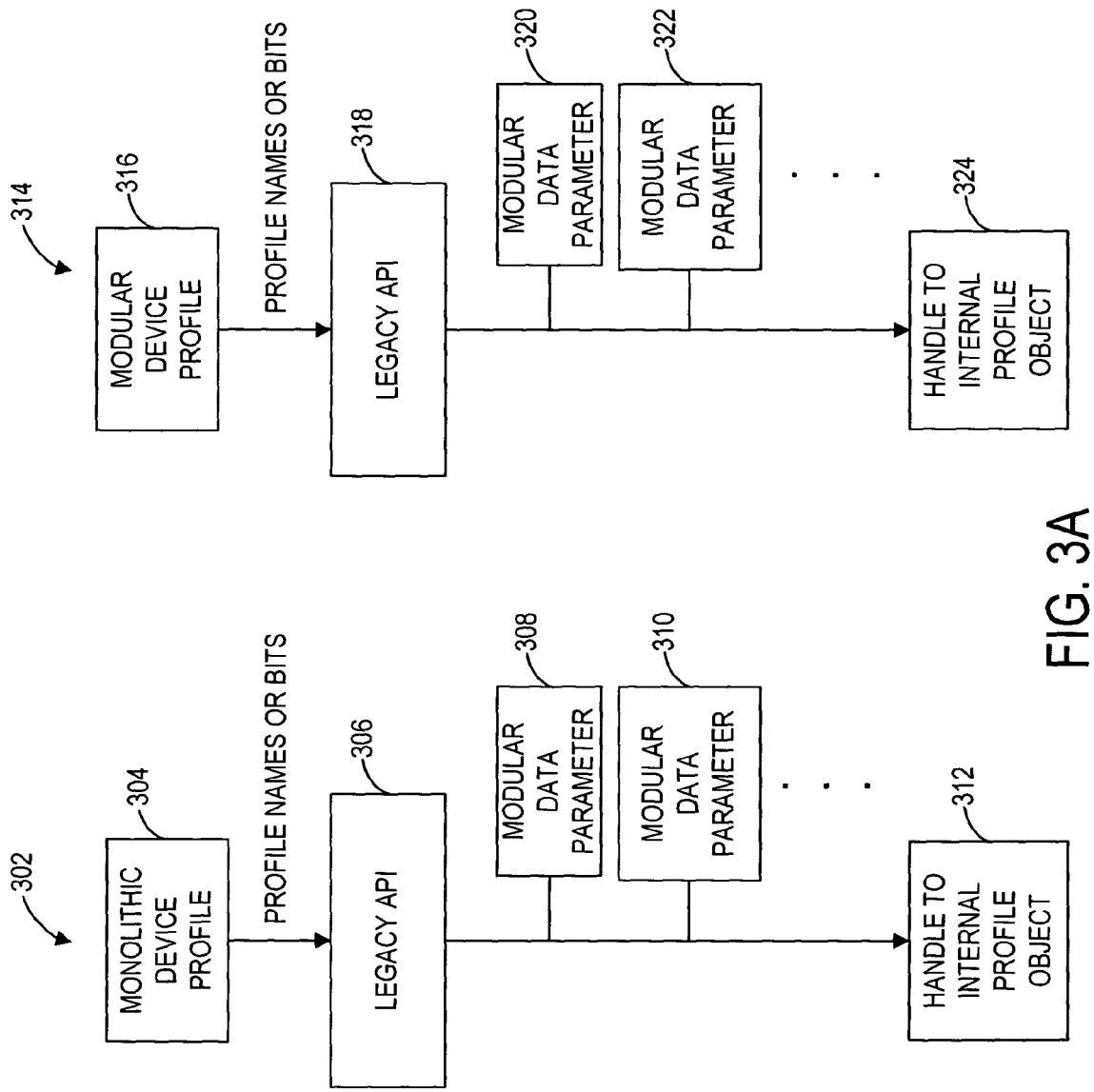
FIG. 3A illustrates an embodiment of a profile creation stage that can process legacy ICC DMPs and new WCS DMPs utilizing legacy ICC behavior and legacy ICC APIs.
Figure 3B:
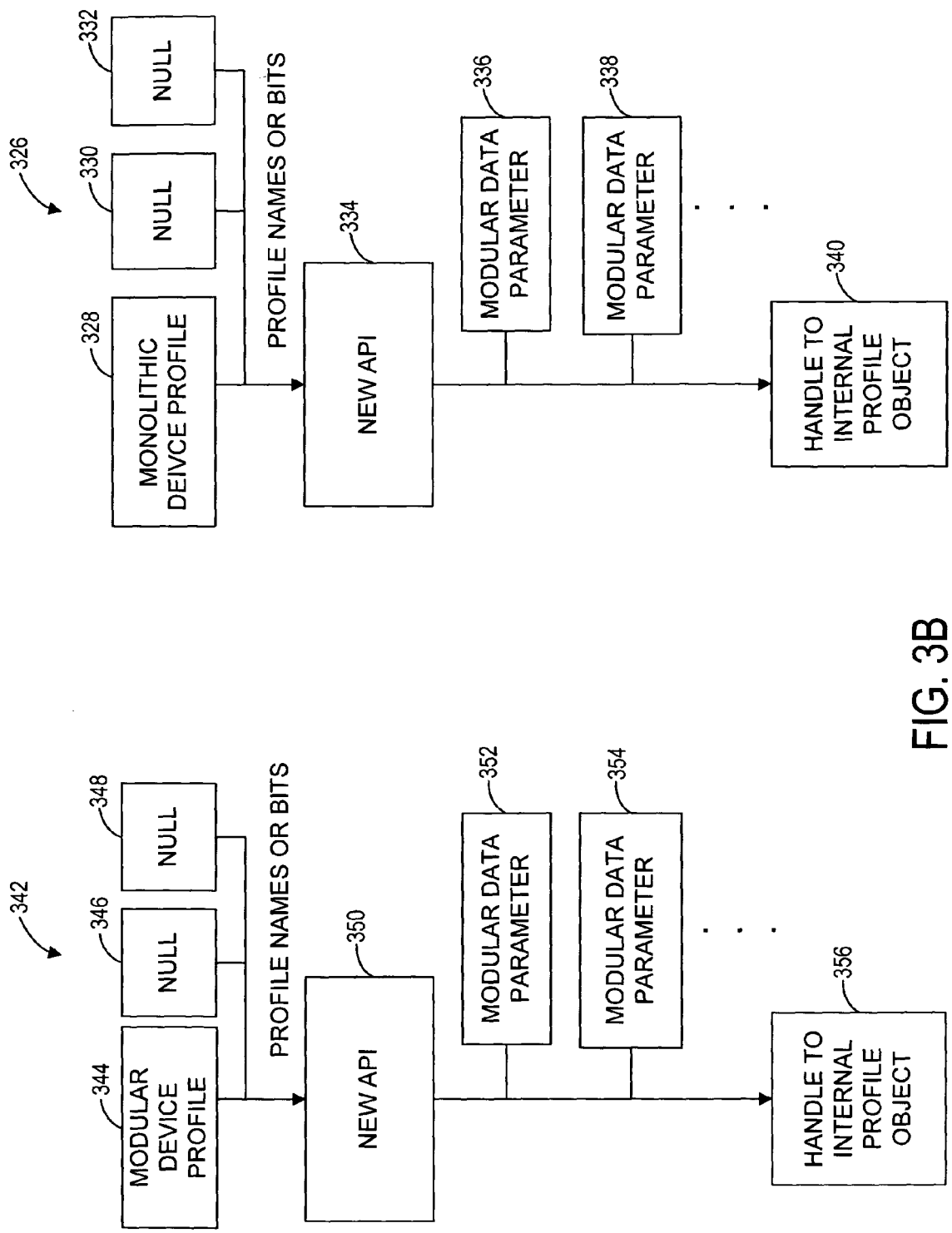
FIG. 3B illustrates an embodiment of a profile creation stage that can process legacy ICC DMPs and new WCS DMPs with a new WCS API while maintaining legacy ICC behavior.
Figure 3C:
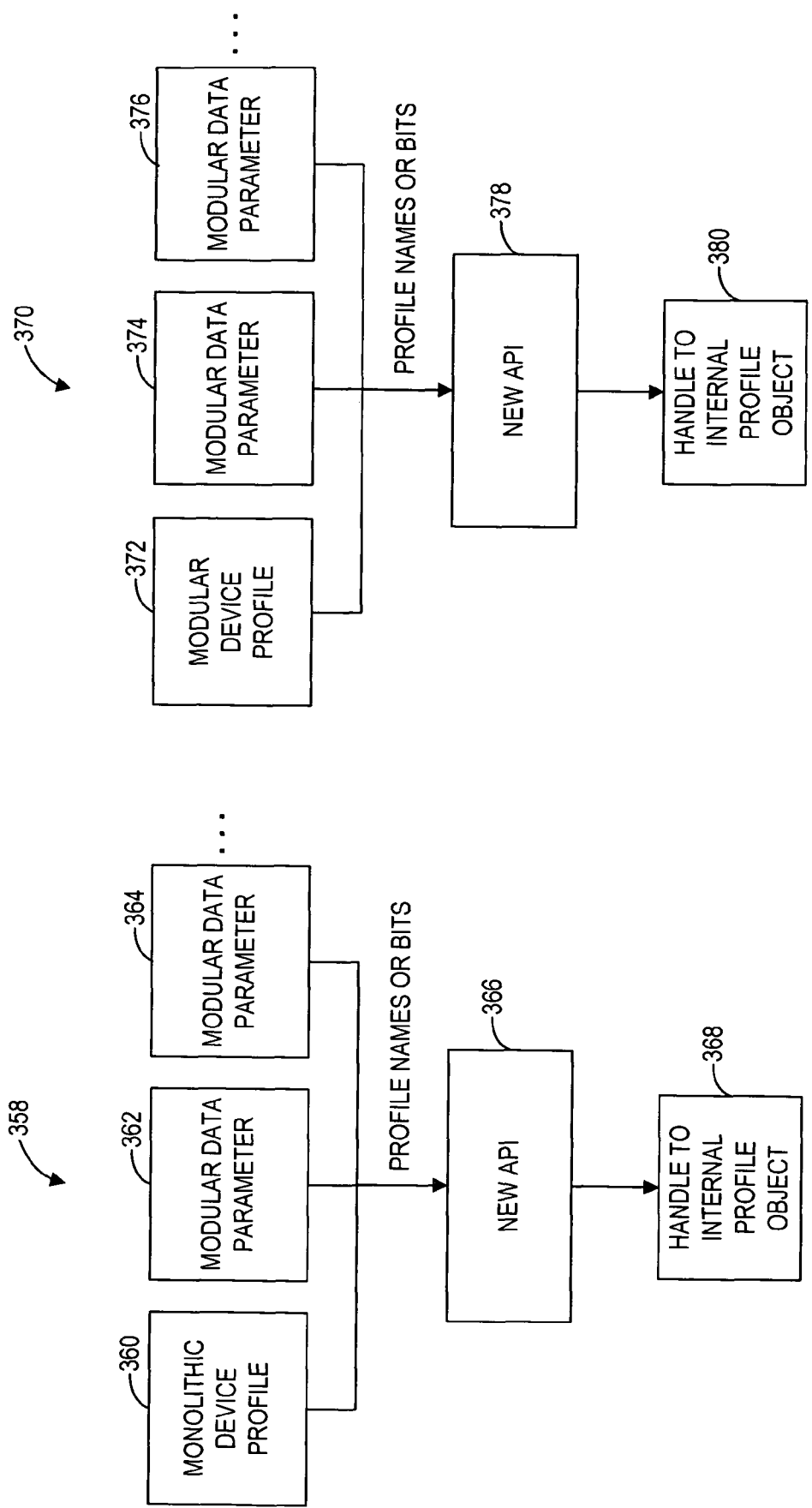
FIG. 3C illustrates an embodiment of a profile creation stage that can process legacy ICC DMPs and new WCS DMPs with a new WCS API while obtaining a new behavior.

FIGS. 3A-3C illustrate six examples of representations of the profile creation stage 202. FIGS. 3A-3C display how either a legacy API or a new API, that has more functionality that the legacy API, can process both monolithic and modular data. In an embodiment involving color management, FIGS. 3A-3C can illustrate how either object. The content translator 114 can be configured to receive the handle created by the transform creator 112 and translate the actual content source from the source device into a destination format to be outputted to the destination device.

Figure 2:
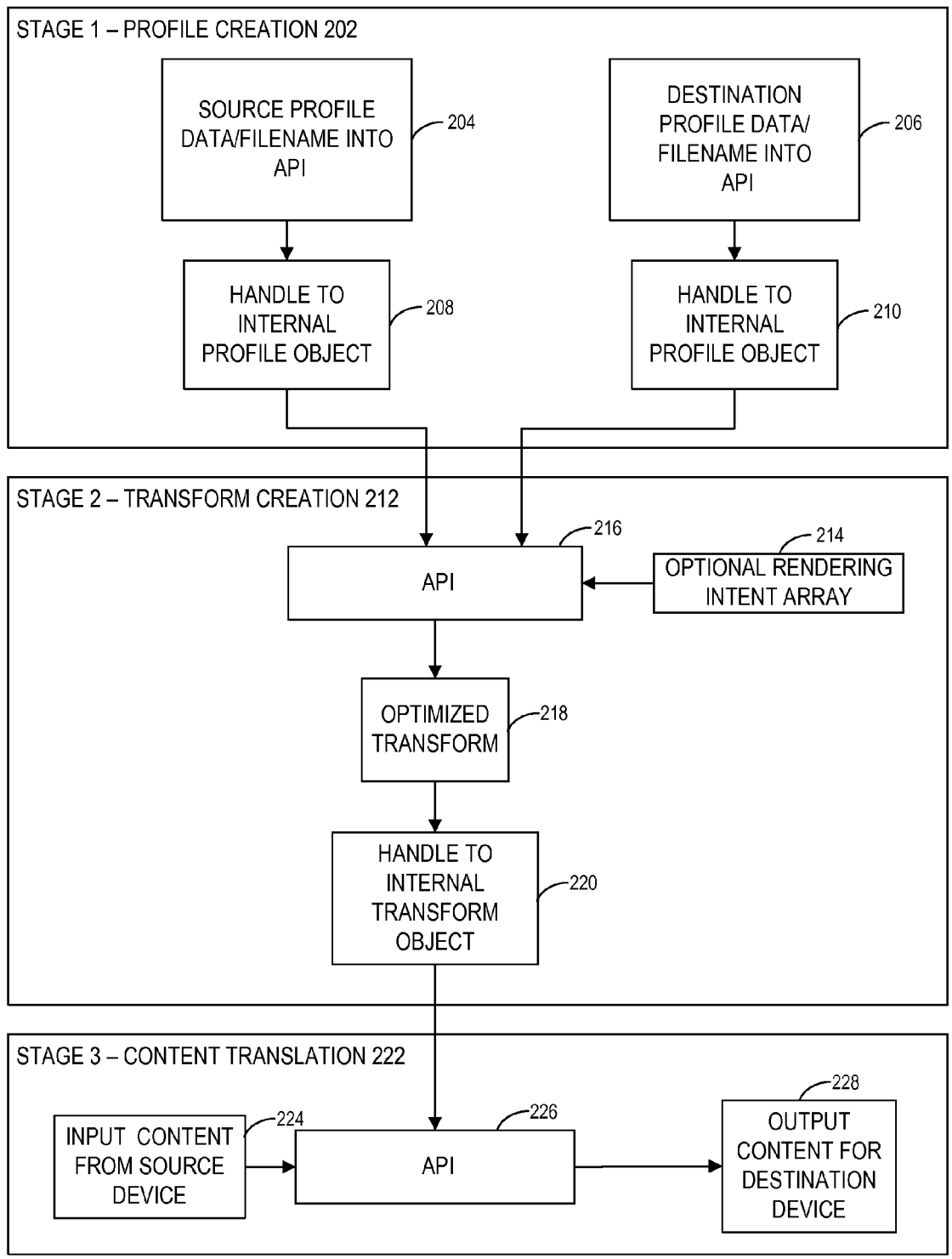
FIG. 2 illustrates an embodiment of a method for translating content from a source device to a destination device.

Again, the invention can be applied to any type of legacy API when adding new functionality to the legacy API. One such application of the invention, involving the introduction of new functionality to a legacy API, can include color management applications and APIs of an operating system. FIG. 2 illustrates an embodiment of a method for translating content from a source device to a destination device. A method for translating content from a source device to a destination device can be executed, for example, with the aide of the core engine of a computer. The translation of content can begin at a first stage profile creation 202. In the profile creation stage 202, the profile creator can receive a source profile from a source device in step 204. The source profile can include a data structure that describes characteristics of the source device. In an embodiment involving color management, the source profile can be a source color profile that can describe color characteristics of the source device. An application within the core engine of the computer can call an API to begin processing the source profile. In an embodiment involving color management, such an API can be, for example, an OpenColorProfile API. The API can be given a data structure that includes a file name to the source profile, or the API can be given a data structure that includes bits of the source profile. The source profile can be referenced by passing a first pointer that points to an object through the API. The object can be, for example, a second pointer that can point to the file name of the source profile. Therefore, the application running the API can process the source profile without requiring the application to have any knowledge of an internal structure of the source a legacy ICC API or a new WCS API can process both legacy ICC device color profiles and new WCS DMPs.

FIG. 3A illustrates an embodiment of a profile creation stage that can process monolithic device profiles and modular device profiles utilizing legacy behavior and legacy APIs. In diagram 302, a monolithic device profile 304 can be processed through a legacy API 306 by inputting a pointer into the API that can point to an object. In an embodiment, the API 306 can be a Open Profile API that can be used to open a device profile. In an embodiment involving color management, monolithic device profile 304 can be an ICC device color profile and the API 306 can be an legacy OpenColorProfile API that can be used to open an ICC device color profile. The object can then reference a file name of the monolithic device profile 304 to be processed. The object can be, for example, a second pointer that can point to the file name of the monolithic device profile. The monolithic device profile 304 can include a profile name or bits of the profile. When the monolithic device profile 304 is passed through the legacy API 306, any number of default modular data parameters can be referenced and associated with the monolithic device profile 304 to create a complete profile. In an embodiment involving color management, the default parameters 308 and 310 can be GMMP and CAMP parameters. The modular data parameters can be stored in a registry from which the parameters are referenced. The referencing of the modular data parameters can be performed inside the function of the legacy API 306 itself. Once the monolithic device profile 304 is processed through the legacy API 306, a handle to an internal profile object can be returned 312.

Diagram 314 illustrates an embodiment of how a legacy API 318 can pass new data without having to change the syntax of the legacy API. A modular device profile 316 can be passed through a legacy API 318 by inputting a pointer that can point to an object. The object can be, for example, a second pointer that can point to the file name of the modular device profile 316. In an embodiment, the legacy API 318 can be a Open Profile API that can be used to open a device profile. In an embodiment involving color management, the modular device profile 316 can be a WCS DMP, and the legacy API 318 can be a legacy OpenColorProfile API that can be used to open a device color profile. The modular device profile 316 can include a profile name or bits of the profile. The modular device profile 316 can be passed and can provide new functionality without having to change the syntax of the legacy API 318. An application, therefore, can pass data through the legacy API 318 regardless if the data is modular or monolithic because a pointer can reference a file name of either a modular device profile or a monolithic device profile without requiring the API to have any knowledge of the internal structure of either device profile. Once the modular device profile 316 is processed through the legacy API 318, any number of modular data parameters can be referenced in order to create a complete profile, and a handle to an internal profile object 324 can be returned. In an embodiment involving color management, the modular data parameters 320 and 322 can be CAMP and GMMP parameters.

FIG. 3B illustrates an embodiment of a profile creation stage that can process monolithic and modular device profiles with a new API while maintaining legacy behavior. A new API can be, for example, an API that has more functionality that a legacy API. A user may want to employ a method shown in diagram 326 or 342 if they are not ready to make radical changes to their applications but do want to start migrating over to a new API so that the user can make evolutionary changes in the future. Through use of diagrams 326 and 342, a user can obtain new functionality through use of a new API, maintain backward compatibility with legacy device profiles, and obtain legacy behavior.

Diagram 326 shows an embodiment of how a monolithic device profile 328 can be processed through a new API 334 while maintaining legacy behavior, and diagram 342 shows an embodiment of how a modular device profile 344 can be processed through a new API 350 while maintaining legacy behavior. In an embodiment, new APIs 334 and 350 can be Open Profile APIs that can be used to open device profiles. In an embodiment involving color management, monolithic device profile 328 and modular device profile 344 can be an ICC device color profile and a WCS DMP respectively, and new APIs 334 and 350 can be WCS OpenColorProfile APIs. In order to maintain legacy behavior, a user can choose to input any number of null parameters (330, 332, 346, 348). By inputting these null parameters the new APIs can simulate legacy behavior as it may appear, similar to a legacy API, that only one parameter is being inputted into the new API. In an embodiment, parameters 330, 332, 346, and 348 can comprise a hybrid of monolithic data and modular data. Legacy behavior can also be maintained, as in FIG. 3A, by referencing any number of default modular data parameters (336, 338, 352, 354) inside the function of the new APIs 334 and 350. In an embodiment involving color management, modular data parameters 336, 338, 352, and 354 can include GMMPs and CAMPs. In diagram 326 a handle to an internal ICC profile object 340 can be returned, and in diagram 342 a handle to an internal WCS profile object can be returned 356.

FIG. 3C illustrates an embodiment of a profile creation stage that can process monolithic device profiles and modular device profiles with a new API while obtaining a new behavior. A new API can be, for example, an API that has more functionality that a legacy API. In an embodiment, new APIs 366 and 378 can be Open Profile APIs that can be used to open device profiles. In an embodiment involving color management, monolithic device profile 360 and modular device profile 372 can be an ICC device color profile and a WCS DMP respectively, and new APIs 366 and 378 can be WCS OpenColorProfile APIs.

Diagram 358 displays an embodiment of how a monolithic device profile 360 can be processed through a new API 366 while obtaining a new behavior, and diagram 370 displays an embodiment of how a modular device profile 372 can be processed through a new API 378 while obtaining a new behavior. Unlike the legacy behavior in which default modular data parameters are referenced from a registry within a legacy or new API, a new behavior can be obtained by explicitly setting what a user wants the modular data parameters to be. For example, modular data parameters 362 and 364 can be set by a user and can be processed through new API 366 along with monolithic device profile 360. The same process can be established with modular data parameters 374 and 376 as both can be set by a user and processed through new API 378 along with modular device profile 372. In both diagrams 358 and 370, a handle to an internal profile object, 368 and 380 respectively, can be returned.

The new APIs shown in FIGS. 3B and 3C can additionally provide another new item of functionality. In an embodiment, the new APIs can be configured in a manner that whenever a new API detects that it is being presented with a monolithic device profile, the new API can search for any corresponding modular device profiles or modular data parameters that have been predetermined by a user policy state. The user policy state can be customized by a user. Once the monolithic data is detected, the new API can be configured to process the modular device profile or the modular data parameters automatically, or the new API can be configured to ignore the corresponding modular device profile or modular data parameters and just process the monolithic data.

In another embodiment, the invention can be configured to provide a structured method for API syntax exception processing to handle a plurality of API recognizable API usage mistakes. This may be useful so that the any API being used in conjunction with the invention can still operate properly when presented with a mistake that it can recognize. If an API usage mistake is recognized, the API can be configured to either correct the mistake or ignore the mistake. API usage mistakes that are to be recognized can be customized by a user.

Figure 4:
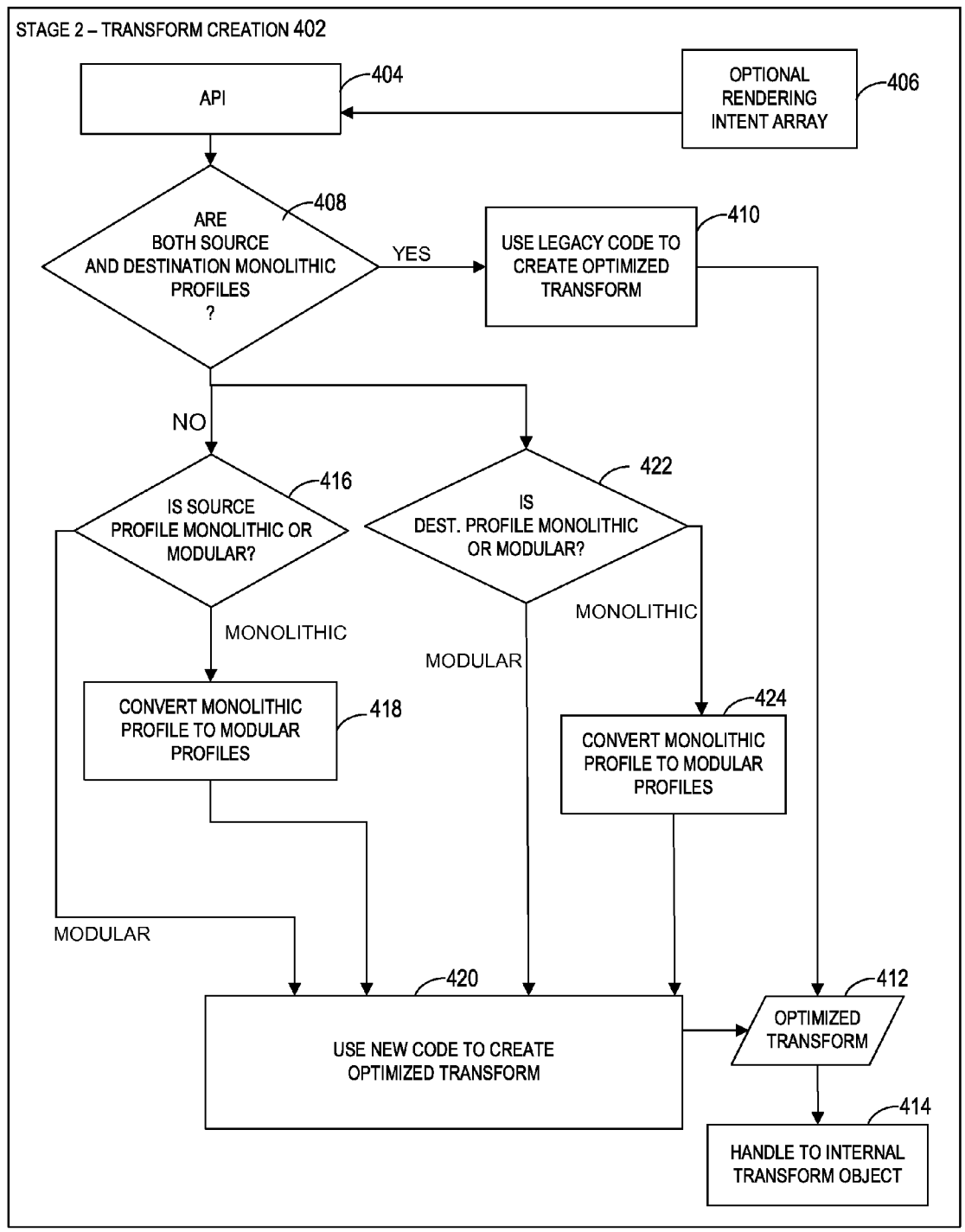
FIG. 4 illustrates an embodiment of a detailed representation of a transform creation stage.

FIG. 4 illustrates an embodiment of a representation of a transform creation stage 402. As mentioned previously in reference to FIG. 2, two handles to internal profile objects from the source device and the destination device can be received and processed by a second API 404 along with an optional rendering intent array 406. In an embodiment involving color management, the second API 404 can be, for example, a CreateMultiProfileTransform API. At step 408, a determination can be made to verify whether both device profiles from the source device and the destination device are monolithic device profiles. If it is determined that both profiles are monolithic, then legacy code 410 can be used to create an optimized transform 412. In an embodiment involving color management, the legacy code 410 can be, for example, Image Color Management 2 (ICM2) code. However, if it is determined that both device profiles are not monolithic device profiles, then a determination as to whether the source device and the destination device include monolithic or modular device profiles may need to be made. At step 416, a decision can be made as to whether the source device includes a monolithic or modular device profile. If the source device includes a modular device profile, then new code 420, designated to be used with modular data, can be used to create the optimized transform 412. In an embodiment involving color management, code 420 can be WCS code. However, if the source device includes a monolithic device profile, the monolithic device profile may need to be converted to a modular device profile at step 418 using another API. Once the conversion has been made, new code 420, that can be designated to be used with modular data, can be used to create an optimized transform 412. At step 422 a decision can be made as to whether the destination device includes a monolithic or modular device profile. If the destination device includes a modular device profile, then new code 420, that can be designated to be used with modular data, can be used to create an optimized transform 412. In an embodiment involving color management, code 420 can be WCS code. However, if the destination device includes a monolithic device profile, then the monolithic device profile may need to be converted to a modular device profile at step 424 using another API. Once the conversion has been made, new code 420, that can be designated to be used with modular data, can be used to create an optimized transform 412. In an embodiment involving color management, code 420 can be WCS code. Once an optimized transform 412 has been created, a handle to an internal transform object 414 can be returned.

Figure 5:
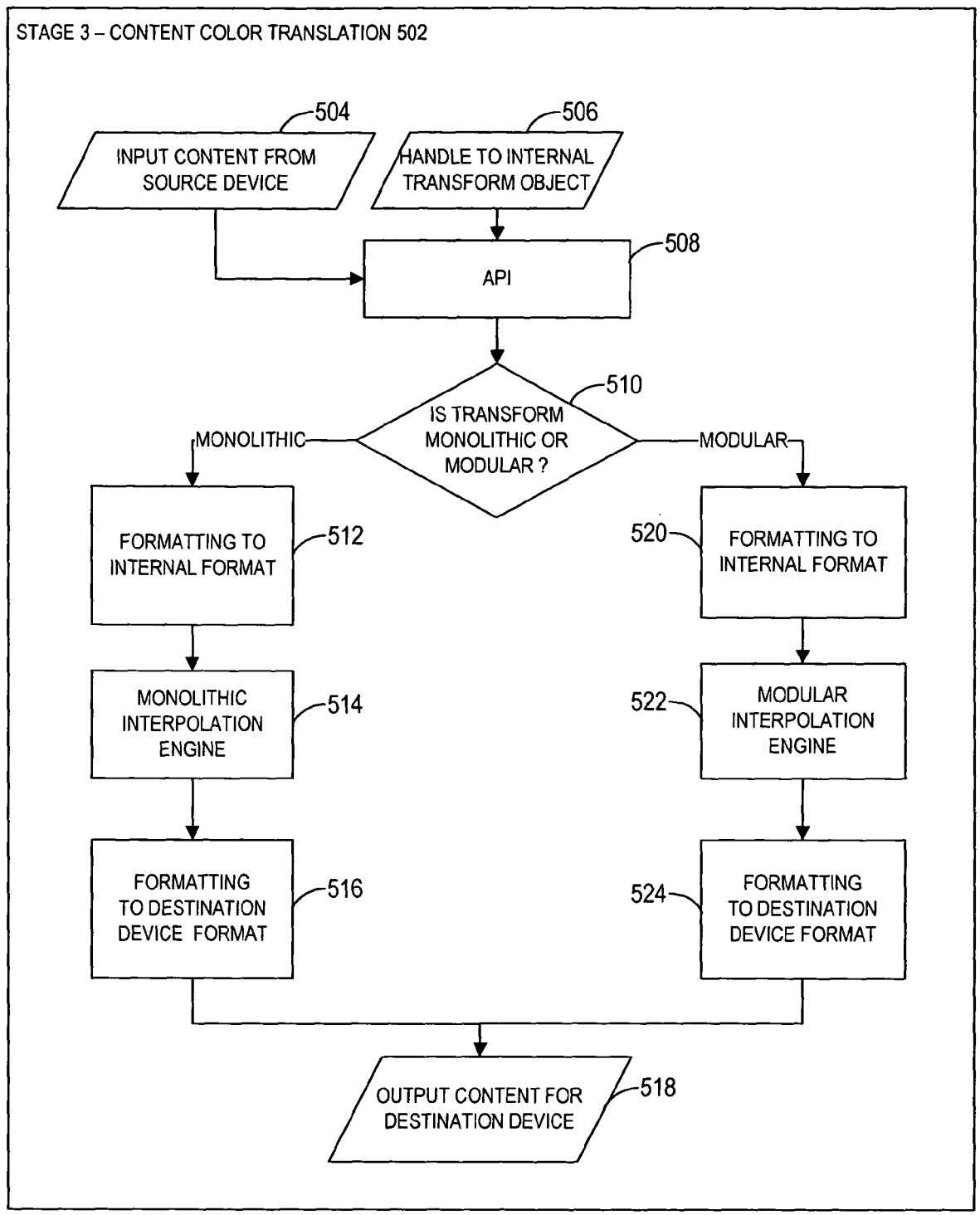
FIG. 5 illustrates an embodiment of a detailed representation of a content translation stage.

FIG. 5 illustrates an embodiment of a representation of a content translation stage 502. As mentioned previously with reference to FIG. 2, a handle to an internal transform object 506 can be inputted into a third API 508 along with the content 504, that can include the content that is to be translated from the source device to the destination device. In an embodiment involving color management, the content 504 can include an array of color content to be transferred from the source device to the destination device, and the API 508 can be, for example, a TranslateColors API. In another embodiment involving color management, the content 504 can include bitmap bits, and the API 508 can be, for example, a TranslateBitmapBits API. A determination can be made at step 510 to decide whether the optimized transform received from the transform creation stage is an monolithic optimized transform or a modular optimized transform. With reference to FIG. 4, a optimized transform can be a monolithic optimized transform if both the source device and the destination device included monolithic device profiles. A optimized transform can be modular if either one of the source or destination devices included a modular device profile. If the optimized transform is an monolithic transform, then processing can continue at step 512 in which formatting to an internal format can be done, then to a monolithic interpolation engine 514, next to step 516 in which formatting to a destination device format can be done, and then to step 518 in which the translated content to the destination device can be outputted. In an embodiment involving color management, steps 512 and 516 can include pixel formatting, and in step 514 the monolithic interpolation engine can be an ICC interpolation engine. However, if the optimized transform is a modular transform, then processing can continue at step 520 in which formatting to an internal format can be done, then to a modular interpolation engine 522, next to step 524 in which formatting to a destination device format can be done, and then to step 518 in which the translated content to the destination device can be outputted. In an embodiment involving color management, steps 520 and 524 can include pixel formatting, and in step 522 the modular interpolation engine can be a WCS interpolation engine.

In an embodiment, transmitting content from one device to another which can involve migrating monolithic and modular device profiles through either a legacy API or a new API can be accomplished with the assistance of a computer program. A computer assisted tool, a wizard interface for example, can automatically analyze and interrogate devices along with device profiles to produce a format of content suitable for a destination device.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A method utilizing a processor and a memory for providing new functionality to an operating system while maintaining backward compatibility with legacy applications, comprising:

inputting a first handle comprising a pointer to a source device profile and a second handle comprising a pointer to a destination device profile into an application programming interface (API);

determining that one of the source device profile or the destination device profile is a monolithic device profile, wherein the monolithic device profile is a legacy profile and is a preprocessed profile that is designed such that a third party is not able to accurately predict what processing is taking place internally to the monolithic device profile;

converting the monolithic device profile to a modular device profile, wherein the modular device profile is not preprocessed and each aspect of processing a profile is documented so that a third party can accurately predict what processing is taking place internally to the modular device profile, and wherein various aspects of the modular device profile can be adjusted without having to change unrelated aspects of the modular device profile;

creating an optimized transform using new code that is designated to be used with at least one modular data parameter; and upon the creation of the optimized transform, returning an internal transform object.

2. The method according to claim 1, wherein one of the source device profile or the destination device profile comprises information that describes color characteristics of a device.

3. The method according to claim 1, wherein the source device profile or the destination device profile comprises the modular device profile.

4. The method according to claim 1, wherein the API has no knowledge of internal workings of the source or the destination profiles.

5. The method according to claim 1, wherein the at least one modular data parameter includes at least one of a color appearance profile and a gamut mapping profile.

6. The method according to claim 1, further comprising combining the source device profile and the at least one modular data parameter to create a combined profile that replaces the monolithic device profile.

7. The method according to claim 1, wherein the source device profile is the monolithic device profile.

8. A method utilizing a processor and a memory for providing new functionality to an operating system while maintaining backward compatibility with legacy applications, comprising:

providing an application programming interface (API) with a first handle to an internal profile object and a second handle to an internal profile object, wherein the first handle comprises a pointer to a monolithic data profile, the monolithic data profile is a legacy profile that is preprocessed and that can be designed or documented such that a third party is not able to accurately predict what processing is taking place internally to the monolithic data profile, and the second handle comprises a pointer to a modular data profile;

converting the monolithic data profile into a plurality of modular data profiles; and creating a transform based on the modular data profile and the plurality of converted modular data profiles.

9. The method according to claim 8, wherein the first handle is associated with a device color profile from a first device and the second handle is associated with device color profile from a second device.

10. The method according to claim 8, wherein the plurality of converted modular data profiles include device color profiles, color appearance profiles, and gamut mapping profiles.

11. The method according to claim 8, further comprising providing a third handle of an internal transform object based on the transform.

12. The method according to claim 11, further comprising inputting the third handle and source device content through another API to transform the source device content into a format of a destination device.

13. A method utilizing a processor and a memory for providing new functionality to an operating system while maintaining backward compatibility with legacy applications, comprising:

receiving an optimized transform of a source device profile and a destination device profile;

returning a plurality of handles directed to an internal object of the optimized transform;

inputting the plurality of handles and content to be translated from a source device to a destination device into an application programming interface (API);

if one of the source device or the destination device includes a modular device profile, then determining that the optimized transform is a modular optimized transform, and wherein a first handle comprises a pointer to the modular device profile;

formatting the content into an internal format;

communicating the formatted content to a modular interpolation engine;

translating the content into a format associated with the destination device; and outputting the translated content to the destination device.

14. The method according to claim 13, wherein the modular device profile comprises information that describes color characteristics of a device.

15. The method according to claim 13, wherein the API has no knowledge of internal workings of the modular device profile.

16. The method according to claim 13, further comprising combining the source device profile associated with the source device and at least one modular data parameter to create a combined profile that replaces a monolithic data profile.

17. The method of claim 13, further comprising:

determining that the optimized transform is a monolithic optimized transform, wherein the optimized transform is the monolithic optimized transform if both the source device and the destination device include a monolithic device profile, and wherein a second handle comprises a pointer to the monolithic device profile;

formatting the content into an internal format;

communicating the formatted content to a monolithic interpolation engine;

translating the content into a format associated with the destination device; and outputting the translated content to the destination device.

* * * * *